United States Patent Office 2,917,490
Patented Dec. 15, 1959

2,917,490
POLYAMIDES FROM NORCAMPHANEAMINO-CARBOXYLIC ACIDS

John R. Caldwell and Winston J. Jackson, Jr., Kingsport, Tenn., assignors to Eastman Kodak Company, Rochester, N.Y., a corporation of New Jersey No Drawing. Application January 16, 1958
Serial No. 709,191

7 Claims. (Cl. 260—78)

This invention relates to norcamphaneaminocarboxylic acids, to resinous polyamides and copolyamides thereof, and to the preparation of these materials.

The new class of monomeric compounds of the invention are represented by the following general formula:

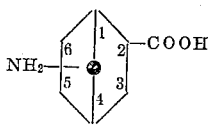

and more specifically, the compounds, norcamphane-5-amino-2-carboxylic acid and norcamphane-6-amino-2-carboxylic acid. These monomeric compounds self-condense at elevated temperatures to give resonous homopolyamides characterized by the recurring structural unit:

(I)

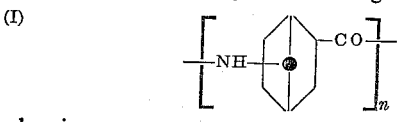

wherein $n$ represents a positive whole number signifying that the unit repeats itself. The above-defined monomers co-condense readily with each other in any proportions. They also readily co-condense with other classes of aminoacids, or compounds generating aminoacids under the conditions of the co-condensation, represented broadly by the following general formula:

$$NH_2—R—COOH$$

wherein R represents a divalent aliphatic or aromatic group, for example, with saturated aliphatic monoamino monocarboxylic acids, salts of dibasic aliphatic acids with diamines, lactams such as caprolactam, etc., in the proportions of at least 50 mole percent of the norcamphaneaminocarboxylic acid, the advantageous range being from 50–95 mole percent but preferably from 50–80 mole percent of the norcamphaneaminocarboxylic acid. Thus, these copolyamides consist of at least 50 mole percent of recurring units of above structure I and the remainder of the molecule of recurring units of the general structure:

(II)

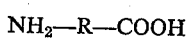

wherein $n$ and R are as previously defined.

The above-described resinous polyamides of the invention can be readily worked into fibers that have a high elastic modulus which property is very important in tire cords. For example, the polyamides of the invention give fibers with an elastic modulus of 65–85, whereas polyamides prepared from the more simple aminocarboxylic acids such as 5-aminocaproic acid as described in W. H. Carothers, U.S. Patent 2,071,251, dated February 16, 1937, under the same testing conditions give fibers with an elastic modulus of only approximately 40. The polyamides of the invention, and more especially the copolyamides, show greatly improved dyeing properties as compared with the polyamides of the aforementioned patent, dyeing heavily with cellulose acetate dyes, premetallized dyes and some acid wool dyes. In general, the fibers of the invention take up 2–4 times as much dye as the products of the said patent under comparable conditions. They also can be dyed with a wider variety of dyes. The polyamides of the invention also have an advantageously high melting point. For example, the homopolyamides of the norcamphaneaminocarboxylic acids melt at approximately 300° C., whereas the polyamides made from the amino acids of the aforementioned patent melt at 210° C. or lower. Because of the high melting points, the norcamphaneaminocarboxylic acid polyamdies can be modified as previously indicated with other amide-forming materials to produce a family of high melting copolymides that show improved dyeing properties. They are also valuable as molding plastics because they tend to soften over a range of 10–15° C. rather than melt sharply. This softening range imparts improved flow properties during molding and extrusion.

It is, accordingly, an object of the invention to provide a new class of aminocarboxylic acids and resinous polyamides therefrom. Another object is to provide resinous materia's that are readily dyeable and highly suitable for preparing fibers, sheets and molded articles that are characterized by good strength and elasticity and by having relatively high softening temperatures. Another object is to provide a process for preparing the new compounds. Other objects will become apparent hereinafter.

In accordance with the invention, we prepare the new monomeric norcamphaneaminocarboxylic acids by reacting bicyclo(2,2,1)hept-5-ene-2-carboxylic acid with a nitrile in the presence of a strong acid to give an addition product which, on treatment with water, yields the corresponding amide. The nitrile may be HCN, an alkyl nitrile, such as acetonitrile, or it may be aryl, such as benzonitrile. For this reaction benzonitri'e is preferred. Sulfuric is the preferred acid, but phosphoric acid can also be used for effecting the condensation. The nitrile may be added to a solution of the bicyclo compound and acid, but the preferred method is to add the acid to a mixture of the bicyclo compound and nitrile. This reaction may be carried out between 0° and 50° C. The preferred range is 15–20° during the addition. The hydrolysis step may be carried out by refluxing with an aqueous solution of a mineral acid, such as hydrochloric or sulfuric, or an aqueous solution of a strong base, such as sodium or potassium hydroxide. Acid hydrolysis is preferred since the organic acid obtained from the amide can be conveniently removed. (The lower alkyl acids, such as acetic, are vo'atile, and the aromatic acids, such as benzoic, crystallize when the reaction mixture cools.) The mineral acid is then removed with an ion exchange column, and an aqueous solution containing the free amino acid is obtained. The steps of the reaction are as follows:

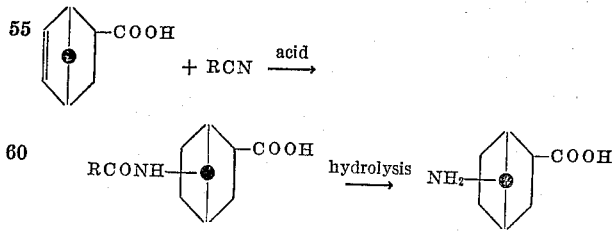

The product is a mixture of the 5-amino and 6-amino derivatives and, if desired, may be used to prepare the various polyamides. However, the reaction can be controlled to give essentially the desired isomer which can be further purified by selective crystallization.

For preparing the homopolyamides and the copolyamides of the invention, we heat the norcamphaneaminocarboxylic acid or mixture of acids alone or with one or more of the other aminoacids or equivalents thereof, in an inert phenolic reaction medium or solvent such as the cresols, but preferably o-cresol, in the specified proportions, at a temperature of from about 200–230° C., until the condensation reaction is substantially complete, and then at 320–340° C. to complete the reaction and to boil off the inert phenolic solvent. The polyamides are obtained in the form of viscous melts which solidify on cooling. Suitable other aminoacids that can be co-condensed with the norcamphaneaminocarboxylic acids include saturated monoaminomonocarboxylic acids represented by the general formula:

$$NH_2-R_1-COOH$$

wherein $R_1$ is an alkylene group of from 5 to 11 carbon atoms, such as 6-amino-n-caproic acid, 7-amino-n-heptanoic acid, 11-aminoundecanoic acid, etc.; salts of saturated dibasic acids represented by the general formula:

$$HOOC-R_2-COOH$$

wherein $R_2$ represents an alkylene group of from 4 to 11 carbon atoms, such as adipic acid, sebacic acid, etc. or an alicyclic group, such as trans-1,4-cyclohexanedicarboxylic acid, with saturated aliphatic diamines containing from 2 to 12 carbon atoms, preferably 4 to 11 carbon atoms, such as tetramethylene diamine, hexamethylenediamine, etc., or with aromatic diamines of the benzene series such as p-phenylene diamine, m-xylene-$\alpha,\alpha'$-diamine or with alicyclic diamines of the cyclohexane series, such as 1,4-cyclohexanebismethylamine, and heterocyclic nitrogen compounds such as caprolactam. In general, the proportions of the respective recurring units in the copolyamides will be found to be approximately the same as the mole proportions of the reactants.

The following examples will serve to illustrate further our new compounds and the manner of preparing the same.

*Example 1*

A. A mixture containing 27.6 g. (0.20 mole) of bicyclo(2.2.1)hept-5-ene-2-carboxylic acid and 20.6 g. (0.20 mole) of benzonitrile was stirred and cooled in an ice bath. Sulfuric acid (40 cc.) was slowly added at such a rate that the temperature did not rise above 20°. When the bath was then removed, the temperature slowly rose to 35°.

After standing overnight, the solution was poured into 400 cc. of ice water. The product, which separated as a stiff, tacky mass, was taken up in ethyl acetate. This solution was washed several times with cold water, dried with sodium sulfate and concentrated on a steam bath. The residue, a thick, viscous, light yellow sirup, weighed 49 g.

B. The above crude benzamide compound was hydrolyzed by refluxing for 5 hrs. with a solution containing 250 cc. of hydrochloric acid and 250 cc. of water. The benzoic acid, which crystallized when the solution cooled, was removed by filtration. The filtrate was slowly passed through a column containing Amberlite IR–4B (a phenolformaldehyde type of ion-exchange resin). This was followed by sufficient water to wash all product from the column. The effluent was partially concentrated on a steam bath, decolorized with activated charcoal, and then taken to dryness. The residue was dissolved in hot water, and isopropanol was added. On cooling, the aminoacid crystallized. It was collected and washed with isopropanol, wt. 10 g. (32% overall yield) of tiny white needles, which did not melt below 300°. A second recrystallization from water-isopropanol yielded polymer grade material. Analysis of the product showed that it contained by weight 62.2% of carbon, 8.4% of hydrogen, 9.0% of nitrogen compared with calculated for $C_8H_{13}NO_2$ of 62.0%, 8.4% and 9.0%, respectively. This indicated that essentially pure product had been obtained which was norcamphane-5-amino-2-carboxylic acid.

*Example 2*

A mixture containing 0.93 g. (0.006 mole) of the amino acid prepared according to Example 1, 0.45 g. (0.004 mole) of 6-caprolactam and 1 cc. of o-cresol was heated at 200° C. under hydrogen. A copolyamide of high viscosity was formed containing about 60 mole percent of the norcamphaneaminocarboxylic acid component represented by the recurring unit

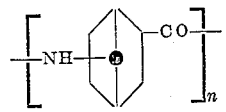

and 40 mole percent of the caprolactam component represented by the recurring unit

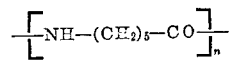

It had a melting point of 230°–240° C. A clear film of this copolyamide could be coated from a formic acid solution thereof. Also, this copolyamide gave strong elastic fibers when spun by the melt process. It was readily dyeable with cellulose acetate dyes and proved useful also as a molding plastic.

*Example 3*

The amino acid prepared according to Example 1 was heated in cresol, in the proportions of 1 part by weight of the acid to 2 parts by weight of o-cresol, at 210°–215° C. for a period of 3 hours. The temperature was then raised to 320°–340° C. to boil off the cresol. Fibers were pulled from the melt which dyed readily, were highly elastic and had a softening temperature of 280°–300° C. The fibers had an elastic modulus of 70–85 depending on the amount of draft. They were readily dyed deep shades with cellulose acetate dyes, premetallized dyes, and acid wool dyes.

*Example 4*

A copolyamide was made from a mixture of 0.70 mole of norcamphane-5-amino-2-carboxylic acid and 0.3 mole of 6-caprolactam by heating in o-cresol at 215°–220° C., followed by volatizing the cresol. The copolyamide contained 70 mole percent of the norcamphaneaminocarboxylic acid component and 30 mole percent of the 6-caprolactam component. It melted at 260°–270° C. and contained approximately 70 mole percent of recurring units represented by above structure II, the remainder of the polymer molecule being recurring $$-NH-(CH_2)_5-CO-$$

units. Fibers prepared from the copolyamide had a tensile strength of 4.6 g. per denier, elongation of 15% and elastic modulus of 82. The fibers were particularly suitable for tire cord.

*Example 5*

A copolyamide was made from 0.66 mole of norcamphane-5-amino-2-carboxylic acid and 0.34 mole of adipic acid-hexamethylenediamine salt by heating the reactants in cresol at 215°–220° C. for 5 hours. The cresol was then eliminated by further heating to 300° C. The copolyamide melted in the range of 250°–270° C. The copolyamide contained 66 mole percent of the norcamphaneaminocarboxylic acid component and 34 mole percent of the adipic acid-hexamethylenediamine component represented by the recurring unit

It was particularly suitable as a molding plastic because the wide softening range imparted good flow properties. The copolyamide also gave strong fibers that had an elastic modulus of 70–80 depending upon the amount of draft. The fibers could be died to deep shades with cellulose acetate dyes, premetallized dyes, and some acid wool dyes.

In place of the salt of adipic acid-hexamethylenediamine in the above example, there may be substituted an equivalent amount of other of the mentioned dibasic acid salts, for example, the salt of sebacic acid-hexamethylenediamine to give generally similar copolyamides that are useful for preparing strong, dyeable fibers. Also, in place of the above salts, there may be substituted salts of adipic and sebacic acids with other diamines such as, for example, 1,4-cyclohexanebismethylamine to give similarly strong and dyeable fibers.

*Example 6*

A copolyamide was made from 0.80 mole of norcamphane-5-amino-2-carboxylic acid and 0.20 mole of the salt of adipic acid-m-xylene-α,α'-diamine, following the procedure of Example 5. The copolyamide contained 80 mole percent of the norcamphaneaminocarboxylic acid component and 20 mole percent of the adipic acid-m-xylene-α,α'-diamine component represented by the recurring unit

It melted in the range of 265°–280° C. Fibers spun from the copolyamide had a tensile strength of 5.0 g. per denier, elongation of 16% and an elastic modulus of 75–83 depending upon the amount of draft. The fibers could be dyed to dark shades with cellulose acetate dyes, premetallized dyes, and acid wool dyes.

*Example 7*

A copolyamide was made from 0.5 mole of norcamphane-5-amino-2-carboxylic acid and 0.5 mole of 7-amino-n-heptanoic acid, following the procedure of Example 5. The copolyamide contained 50 mole percent of the norcamphaneaminocarboxylic acid component and 50 mole percent of the 7-amino-n-heptanoic acid component represented by the recurring unit

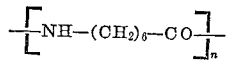

It melted over a range of 160°–180° C. and was valuable for the production of clear, strong films.

In place of the 7-amino-n-heptanoic acid in the above example, there may be substituted an equivalent amount of any other of the mentioned amino acids, but preferably acids such as 6-amino-n-caproic acid, 8-amino-n-caprylic acid, 11-aminoundecanoic acid, etc., to give generally similar copolyamides that are useful for the preparation of clear, strong films.

By following the procedures of the above examples for the preparation of copolyamides, other resinous copolymides having generally similar properties can be prepared with any of the mentioned comonomers in the specified range of proportions. If desired, materials such as filters, dyes, lubricants, plasticizers, and the like, can be incorporated into the homopolyamides and copolyamides of the invention. They are thermoplastic and can be fashioned into fibers and sheets by melt spinning or extrusion techniques, and can also be molded into stable, shaped articles by conventional molding methods. The sheet materials are suitable as photographic film supports.

What we claim is:

1. A linear condensation-type polyamide of bifunctional polyamide-forming constituents of which (1) at least 50 mole percent is at least one of the 2,5- and 2,6-isomers of norcamphaneaminocarboxylic acid and of which (2) up to 50 mole percent is selected from the group constituting of (a) a saturated aliphatic aminocarboxylic acid having from 5–11 carbon atoms, (b) caprolactam, and (c) equimolar quantities of a saturated dicarboxylic acid having from 4–11 carbon atoms and a saturated diamine having from 2–12 carbon atoms, the proportions of (1) and (2) above being such as to constitute a linear condensation-type polyamide which is fiber-forming and melts at from about 210° C. to about 340° C.

2. A linear condensation-type polyamide selected from the group consisting of (1) a homopolyamide of a norcamphaneaminocarboxylic acid selected from the group consisting of norcamphane-5-amino-2-carboxylic acid and norcamphane-6-amino-2-carboxylic acid, (2) a linear condensation-type copolyamide of 50 mole percent of norcamphane-5-amino-2-carboxylic acid and up to 50 mole percent of a compound selected from the group consisting of (a) norcamphane-6-amino-2-carboxylic acid, (b) caprolactam, and (c) an aminoacid represented by the general formula:

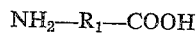

wherein $R_1$ represents an alkylene group having from 5–11 carbon atoms, (3) a linear condensation-type copolyamide of at least 50 mole percent of said norcamphaneaminocarboxylic acid and up to 50 mole percent in equimolar quantities of (a) a dibasic acid represented by the general formula:

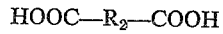

wherein $R_2$ represents an alkylene group having from 4–11 carbon atoms and (b) a diamine compound selected from the group consisting of a saturated alkylene diamine having from 2–12 carbon atoms, p-phenylene diamine, m-xylene-α,α'-diamine and 1,4-cyclohexanebismethylamine, and (4) a linear condensation-type copolyamide of at least 50 mole percent of said norcamphaneaminocarboxylic acid and up to 50 mole percent in equimolar quantities of (a) trans-1,4-cyclohexanedicarboxylic acid and (b) said diamine compound, the said polyamide being fiber-forming and having a melting point from about 210° C. to about 340° C.

3. Homopolyamide of norcamphane-5-amino-2-carboxylic acid characterized by being fiber-forming and having a melting point about from 320–340° C.

4. A copolyamide of from 50–95 mole percent of norcamphane-5-amino-2-carboxylic acid and 50–5 mole percent of 6-caprolactam, the said copolyamide consisting essentially of the recurring structural units:

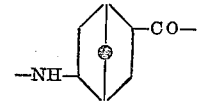

and

in the said molar proportions.

5. A copolyamide of from 50–95 mole percent of norcamphane-5-amino-2-carboxylic acid and from 50–5 mole percent of equimolar amounts of adipic acid and hexamethylenediamine.

6. A copolyamide of from 50–95 mole percent of norcamphane-5-amino-2-carboxylic acid and from 50–5 mole percent of equimolar amounts of adipic acid and m-xylene-α,α'-diamine.

7. A copolyamide of from 50–95 mole percent of norcamphane-5-amino-2-carboxylic acid, and from 50–5 mole percent of 7-amino-n-heptanoic acid.

References Cited in the file of this patent

FOREIGN PATENTS 802,158 Germany _____ Feb. 5, 1951

OTHER REFERENCES

Asahina et al.: Chem. Abstracts, vol. 29, page 2525⁸. (Copy in Scientific Library.)